Patented Apr. 17, 1951

2,549,430

UNITED STATES PATENT OFFICE 2,549,430

PROCESS OF REDUCING CORROSION AND COMPOSITION OF REDUCED CORROSIVE-NESS

Eugene D. Crittenden, Petersburg, Va., assignor to Allied Chemical & Dye Corporation, a corporation of New York No Drawing. Application December 16, 1944, Serial No. 568,560

13 Claims. (Cl. 71—30)

This invention relates to a method of reducing corrosion of ferrous metals by aqueous ammonium nitrate-urea solutions and to new compositions of matter of reduced corrosiveness towards such metals and, hence, suitable for storage, transportation and use in contact therewith.

Aqueous solutions of ammonium nitrate and urea may be utilized for such purposes as the production of fertilizers by mixing the solution with materials containing desired fertilizer constituents, or the solution itself may be directly applied to the soil it is desired to fertilize. Such solutions may contain widely varying proportions of ammonium nitrate and urea with sufficient water to dissolve these normally solid constituents. For example, the solutions advantageously contain at least 10% by weight of each of the two materials; i. e., a total weight of the two materials amounting to at least 20% of the solution. There is no necessary upper limit in the amount of the ammonium nitrate and urea which may be present in the solution. This will depend upon the mutual solubilities of the two materials at various temperatures. It is frequently desirable, however, that the solutions contain no more of the two materials than is soluble in the water present at a temperature of about 30° C. Such solutions may contain maximum concentrations of about 53% to 68% ammonium nitrate with the urea concentration being decreased from 42% to 10% as the ammonium nitrate concentration is increased over the foregoing range. They may contain maximum concentrations of about 42% to 55% urea with the ammonium nitrate concentration being decreased from 53% to 10% as the urea concentration is increased from 42% to 55%. The invention is not limited, however, to compositions in which solid is not present. The described solutions are corrosive towards ferrous metals generally used for construction of the containers in which solutions of this nature are handled or shipped and of the apparatus with which they come into contact during use.

It is an object of this invention to provide a method for reducing the rate of attack of ferrous metals by aqueous solutions of ammonium nitrate and urea which corrode such metals and to provide a novel solution containing ammonium nitrate, urea and water of reduced corrosiveness towards ferrous metals.

I have discovered that a limited small amount of free ammonia dissolved in an aqueous solution of ammonium nitrate and urea reduces the corrosiveness of that solution towards ferrous metals commonly used for the construction of storage tanks, tank cars, piping and other apparatus for handling and using such solutions. The ferrous metals include cast iron, wrought iron and low carbon steels, for example structural steel. Accordingly, my invention comprises dissolving in the aqueous ammonium nitrate-urea solution which is to be contacted with ferrous metals a small amount of free ammonia which is only a fraction of a percent by weight of the solution and which decreases the corrosiveness of the solution towards the ferrous metals. In general, the amount of free ammonia effective to reduce the corrosiveness of the solution does not exceed substantially 0.2% by weight of the solution and I preferably use 0.05% to 0.1% of ammonia. Solutions containing these small quantities of free ammonia are less corrosive towards ferrous metals than are the aqueous ammonium nitrate-urea solutions containing no free ammonia. On the other hand, solutions containing substantially greater quantities of free ammonia than set forth above are more corrosive towards ferrous metals than solutions containing these limited quantities of free ammonia and, as the amount of ammonia is increased, the corrosiveness of the solution may even exceed that of the solutions containing no free ammonia.

In this specification and the appended claims the term "free ammonia" refers to ammonia free to react with a strong acid such as sulfuric acid. The term "free ammonia" includes, therefore, not only uncombined ammonia but ammonia as ammonium hydroxide or ammonium carbonate or carbamate. The quantity of free ammonia contained in any given solution may be determined by titrating the solution with sulfuric acid using phenolphthalein as the indicator.

This invention has specific application to any aqueous solution of ammonium nitrate and urea, but most advantageously to solutions containing at least 10% by weight each of ammonium nitrate and urea and up to 68 or more percent by weight of ammonium nitrate and 55 or more percent by weight of urea. The invention is not limited, however, to aqueous solutions containing only ammonium nitrate and urea.

While the presence of the limited amount of free ammonia described above in the aqueous ammonium nitrate-urea solutions materially reduces the rate of attack of ferrous metals by these solutions, the action of the free ammonia in limiting the corrosion may be supplemented by the presence in the solution of a compound containing divalent sulfur linked to carbon such as is disclosed in U. S. P. 2,215,092 which issued September 17, 1940. When these compounds are employed in addition to the free ammonia, the quantities used may be those indicated in said patent for strongly ammoniacal ammonium nitrate solutions, e. g. the solutions preferably contain 0.004% to 0.8% of the compounds containing divalent sulfur linked to carbon, these percentages being calculated on the basis of the sulfur content of the compound present.

In order that this invention may be more clearly understood, the following examples, typical of preferred solutions, are given by way of illustration:

*Example 1.*—A solution of ammonium nitrate and urea in water saturated at 0° C. contains by weight about 44% ammonium nitrate, 36% urea and 20% water. Such a solution was found to corrode a mild steel at room temperatures at the rate of 0.05 inch penetration per year. By dissolving in this solution sufficient ammonia so that the solution contained 0.05% by weight free ammonia, its corrosiveness towards the mild steel was reduced to 0.03 inch penetration per year. By also dissolving in the solution 0.1% of ammonium thiocyanate the rate of corrosion of the mild steel was reduced to 0.007 inch penetration per year.

*Example 2.*—Ammonium bicarbonate was dissolved in an aqueous ammonium nitrate-urea solution saturated at 0° C., in amount sufficient to give a solution containing substantially 0.22% free ammonia and 0.55% $CO_2$. The addition of this quantity of free ammonia in the form of ammonium bicarbonate reduced the corrosiveness of the solution toward mild steel from 0.05 inch penetration per year to 0.03 inch penetration per year. By also adding to the solution 0.1% of ammonium thiocyanate the rate of corrosion of the steel was further reduced to 0.003 inch penetration per year.

In place of the ammonium bicarbonate used in Example 2, ammonium carbonate may be dissolved in the aqueous ammonium nitrate-urea solution. 0.03% free ammonia dissolved in the solution as ammonium carbonate reduced its corrosiveness toward mild steel from 0.05 to 0.03 inch penetration per year. With 0.1% ammonium thiocyanate also dissolved in the solution, its rate of corrosion of the steel was further reduced to 0.003 inch penetration per year.

I claim:

1. The process of reducing corrosion at atmospheric temperatures of ferrous metals by an aqueous solution of ammonium nitrate and urea which comprises incorporating in said solution a small amount of free ammonia which is only a fraction of a percent by weight of the solution and which decreases the corrosiveness of the solution at atmospheric temperatures towards a ferrous metal to less than that of a neutral solution of the same ammonium nitrate and urea content and contacting said solution with said ferrous metal at said temperatures.

2. The process of reducing corrosion at atmospheric temperatures of ferrous metals by an aqueous solution of ammonium nitrate and urea containing at least 10% by weight of each of said compounds which comprises incorporating in said solution 0.03% to substantially 0.2% by weight of free ammonia and contacting said solution with said ferrous metal at atmospheric temperatures.

3. The process of reducing corrosion at atmospheric temperatures of ferrous metals by an aqueous solution of ammonium nitrate and urea which comprises incorporating in said solution substantially 0.05% to 0.1% by weight of free ammonia and contacting said solution with said ferrous metal at atmospheric temperatures.

4. The process of reducing corrosion at atmospheric temperatures of ferrous metals by an aqueous solution of ammonium nitrate and urea which comprises incorporating in said solution a compound containing divalent sulfur linked to carbon and free ammonia in amount not greater than substantially 0.2% by weight of the solution and contacting said solution with said ferrous metal at atmospheric temperatures.

5. The process of reducing corrosion at atmospheric temperatures of ferrous metals by an aqueous solution of ammonium nitrate and urea which comprises incorporating in said solution a compound containing divalent sulfur linked to carbon and substantially 0.05% to 0.1% by weight of free ammonia and contacting said solution with said ferrous metal at atmospheric temperatures.

6. As a new composition of matter suitable for storage, transportation and use in contact with ferrous metals at atmospheric temperatures an aqueous solution of ammonium nitrate and urea containing a small amount of free ammonia which is only a fraction of a percent by weight of the solution and which decreases the corrosiveness of the solution at atmospheric temperatures towards ferrous metals to less than that of a neutral solution of the same ammonium nitrate and urea content.

7. As a new composition of matter suitable for storage, transportation and use in contact with ferrous metals at atmospheric temperatures an aqueous solution of ammonium nitrate and urea, containing at least 10% by weight of each of said compounds and also containing free ammonia in amount ranging from 0.03% to substantially 0.2% by weight.

8. As a new composition of matter suitable for storage, transportation and use in contact with ferrous metals at atmospheric temperatures an aqueous solution of ammonium nitrate and urea containing 0.05% to 0.1% by weight free ammonia.

9. As a new composition of matter suitable for storage, transportation and use in contact with ferrous metals at atmospheric temperatures an aqueous solution of ammonium nitrate and urea containing a compound containing divalent sulfur linked to carbon and free ammonia in amount not greater than substantially 0.2% by weight.

10. As a new composition of matter suitable for storage, transportation and use in contact with ferrous metals at atmospheric temperatures an aqueous solution of ammonium nitrate and urea containing a compound containing divalent sulfur linked to carbon and 0.05% to 0.1% by weight free ammonia.

11. The process of reducing corrosion at atmospheric temperatures of ferrous metals by an aqueous solution of ammonium nitrate and urea containing at least 10% by weight of each of said compounds which comprises incorporating in said solution free ammonia in amount not greater than substantially 0.2% by weight of the solution and contacting said solution with said ferrous metal at atmospheric temperatures.

12. As a new composition of matter suitable for storage, transportation and use in contact with ferrous metals at atmospheric temperatures an aqueous solution of ammonium nitrate and urea containing at least 10% by weight of each of said compounds and free ammonia in amount not greater than substantially 0.2% by weight.

13. The process of reducing corrosion at atmospheric temperatures of ferrous metals by an aqueous solution of ammonium nitrate and urea containing at least 10% by weight of each of said compounds which comprises incorporating in said solution a compound containing divalent sulfur linked to carbon and 0.03% to substantially 0.2% by weight of free ammonia and contacting said solution with said ferrous metal at atmospheric temperatures.

EUGENE D. CRITTENDEN.

REFERENCES CITED

The following references are of record in the file of this patent:

UNITED STATES PATENTS

| Number | Name | Date |
|---|---|---|
| 1,036,896 | Peacock | Aug. 27, 1912 |
| 1,475,563 | Brooks | Nov. 27, 1923 |
| 1,987,552 | Fauser | Jan. 8, 1935 |
| 2,078,256 | Lieber | Apr. 27, 1937 |
| 2,215,077 | Beekhuis et al. | Sept. 17, 1940 |
| 2,238,651 | Keenen | Apr. 15, 1941 |
| 2,366,796 | Lawrence | Jan. 9, 1945 |
| 2,434,899 | Biggs | Jan. 27, 1948 |

OTHER REFERENCES

Gregory: "Uses and Applications of Chemicals and Related Materials," 1939, Reinhold Pub. Co., N. Y., page 52.

Gilman: "Organic Chemistry," Wiley and Sons, N. Y. (1938 ed.), vol. 1, page 709.